United States Patent
Pang et al.

(10) Patent No.: US 11,227,388 B2
(45) Date of Patent: Jan. 18, 2022

(54) CONTROL METHOD AND DEVICE FOR MOBILE PLATFORM, AND COMPUTER READABLE STORAGE MEDIUM

(71) Applicant: SZ DJI TECHNOLOGY CO., LTD., Shenzhen (CN)

(72) Inventors: Lei Pang, Shenzhen (CN); Cong Zhao, Shenzhen (CN); Liliang Zhang, Shenzhen (CN); Gao Zhu, Shenzhen (CN); Sijin Li, Shenzhen (CN); Yao Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/935,709

(22) Filed: Jul. 22, 2020

(65) Prior Publication Data
US 2020/0349704 A1 Nov. 5, 2020

Related U.S. Application Data

(63) Continuation of application No. PCT/CN2018/073769, filed on Jan. 23, 2018.

(51) Int. Cl.
*G06K 9/00* (2006.01)
*G06T 7/00* (2017.01)
(Continued)

(52) U.S. Cl.
CPC ........ *G06T 7/0012* (2013.01); *G06K 9/00362* (2013.01); *G06K 9/6215* (2013.01); *G06T 7/20* (2013.01); *G06T 2207/30196* (2013.01)

(58) Field of Classification Search
None
See application file for complete search history.

(56) References Cited

U.S. PATENT DOCUMENTS

| 8,456,567 B2 * | 6/2013 | Endoh | H04N 5/23222 |
| | | | 348/349 |
| 11,048,919 B1 * | 6/2021 | Modolo | G06K 9/00771 |

(Continued)

FOREIGN PATENT DOCUMENTS

| CN | 101251895 A | 8/2008 |
| CN | 104081757 A | 10/2014 |

(Continued)

OTHER PUBLICATIONS

The World Intellectual Property Organization (WIPO) International Search Report for PCT/CN2018/073769 dated Sep. 28, 2018 6 pages.

*Primary Examiner* — Soo Jin Park
(74) *Attorney, Agent, or Firm* — Anova Law Group, PLLC

(57) ABSTRACT

A control method for a mobile platform includes obtaining a captured image, identifying one or more candidate first characteristic parts from the captured image, determining a second characteristic part of a target object in the captured image, determining one or more matching parameters each corresponding to one of the one or more candidate first characteristic parts based on the one or more candidate first characteristic parts and the second characteristic part, determining a target first characteristic part of the target object from the one or more candidate first characteristic parts based on the one or more matching parameters, and switching from tracking the second characteristic part to tracking the target first characteristic part in response to a tracking parameter of the target object meeting a preset tracking condition.

21 Claims, 4 Drawing Sheets

(51) Int. Cl.
 G06K 9/62 (2006.01)
 G06T 7/20 (2017.01)

(56) References Cited

U.S. PATENT DOCUMENTS

| | | |
|---|---|---|
| 2005/0031166 A1 | 2/2005 | Fujimura et al. |
| 2014/0247374 A1* | 9/2014 | Murakami ....... H04N 5/232945 348/222.1 |
| 2020/0057881 A1* | 2/2020 | Zhang ................ G06K 9/00255 |

FOREIGN PATENT DOCUMENTS

| | | |
|---|---|---|
| CN | 105654512 A | 6/2016 |
| CN | 106485735 A | 3/2017 |
| CN | 106598226 A | 4/2017 |
| CN | 104081757 B | 10/2017 |
| CN | 107438173 A | 12/2017 |

* cited by examiner

CONTROL METHOD AND DEVICE FOR MOBILE PLATFORM, AND COMPUTER READABLE STORAGE MEDIUM

CROSS-REFERENCE TO RELATED APPLICATION

This application is a continuation of International Application No. PCT/CN2018/073769, filed Jan. 23, 2018, the entire content of which is incorporated herein by reference.

TECHNICAL FIELD

The present disclosure relates to electronic technique and, more particularly, to a control method and device for mobile platform, and computer readable storage medium.

BACKGROUND

Existing tracking strategy is to track a characteristic part having obvious characteristics of a target object. Usually during the tracking of a fixed characteristic part of the target object, as the distance between a mobile platform and the target object changes, the size proportion of a tracking frame of the target object's characteristic part in the captured image also changes accordingly, which leads to a poor quality performance of the tracking.

For example, when the distance between the mobile platform and the target object is very short, the size of the tracking frame at the characteristic part in the captured image is relatively large, which will cause the tracking speed to slow down and thus easily result in the loss of tracking. On the other hand, when the distance between the mobile platform and the target object is relatively long, the size of the tracking frame of the characteristic part in the captured image is small, which will lead to a blurred tracking feature with less useful information. Both of the two situations mentioned above will lower the reliability of the tracking.

SUMMARY

In accordance with the disclosure, there is provided a control method for a mobile platform including obtaining a captured image, identifying one or more candidate first characteristic parts from the captured image, determining a second characteristic part of a target object in the captured image, determining one or more matching parameters each corresponding to one of the one or more candidate first characteristic parts based on the one or more candidate first characteristic parts and the second characteristic part, determining a target first characteristic part of the target object from the one or more candidate first characteristic parts based on the one or more matching parameters, and switching from tracking the second characteristic part to tracking the target first characteristic part in response to a tracking parameter of the target object meeting a preset tracking condition.

Also in accordance with the disclosure, there is provide a mobile platform including a memory storing a computer program and a processor configured to execute the computer program to obtain a captured image, identify one or more candidate first characteristic parts from the captured image, determine a second characteristic part of a target object in the captured image, determine one or more matching parameters each corresponding to one of the one or more candidate first characteristic parts based on the one or more candidate first characteristic parts and the second characteristic part, determine a target first characteristic part of the target object from the one or more candidate first characteristic parts based on the one or more matching parameters, and switch from tracking the second characteristic part to tracking the target first characteristic part in response to a tracking parameter of the target object meeting a preset tracking condition.

DETAILED DESCRIPTION OF THE EMBODIMENTS

Figure 1:
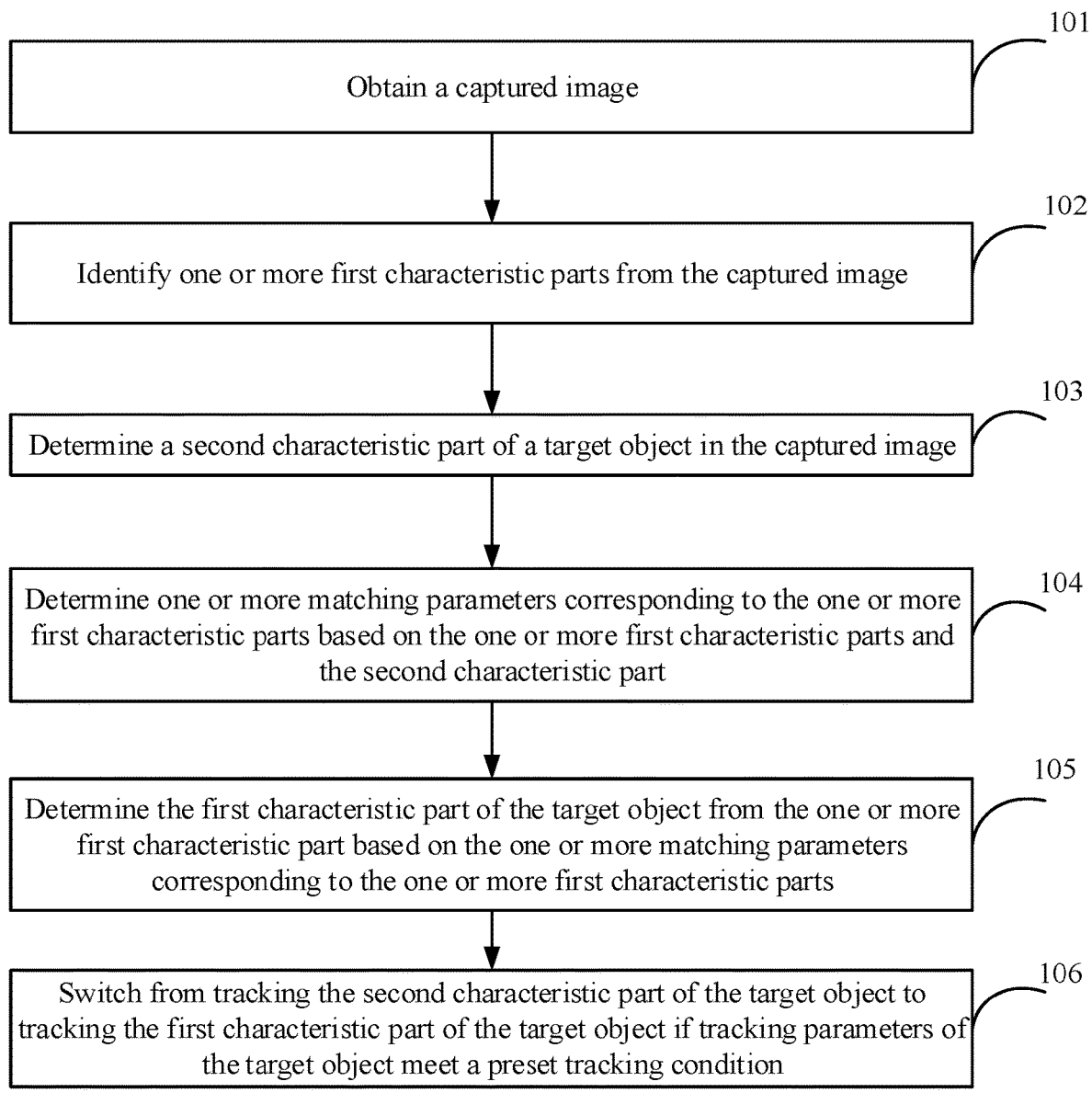
FIG. 1 is a schematic flow chart of a control method of a mobile platform according to an example embodiment.

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure. Further, in the case of no conflict, the following embodiments and features of the embodiments can be combined with each other.

Terms used in the specification of the present disclosure are intended to describe example embodiments, instead of limiting the present disclosure. The singular forms "a," "the," and "this" as used in the present disclosure and claims are intended to also include the plural forms, unless the context clearly indicates otherwise. The term "and/or" used herein includes any suitable combination of one or more related items listed.

Although the terms "first," "second," and "third," etc. may be used in the present disclosure to describe various information, the information should not be limited to these terms. These terms are used to distinguish the same type of information from each other. For example, the first information may also be referred to as the second information without departing from the scope of the present disclosure, and vice versa. Depending on context. the terms "if" can be interpreted as "at," "when," or "in response to."

In the embodiments of the present disclosure, a control method of mobile platform is provided. The mobile platform may include, but is not limited to, an unmanned aerial vehicle, a ground robot (e.g., an unmanned vehicle, etc.). In some embodiments, the mobile platform can include an image capturing device and can capture images through the image capturing device. In some embodiments, the mobile platform can include a gimbal, which can carry the image capturing device, such as a camera, to stabilize and/or adjust the image capturing device.

In the embodiments of the present disclosure, an unmanned aerial vehicle (UAV) is used as an example of the mobile platform for descriptive purposes, and all the terms "unmanned aerial vehicle" (or "UAV") can be replaced with "mobile platform."

In the conventional technologies, a single characteristic part of a target object is tracked. For example, a human body or a preset part of the human body (e.g., head) of the target object is used as the tracking target. In this disclosure, a human body of the target object is also referred to as a "target human body." However, during the tracking of the single characteristic part of the target object, like the distance between the UAV and the target object changes, the size proportion of the tracking frame of the target object's characteristic part in the captured image also changes accordingly, which leads to a poor tracking performance.

For example, when the distance between the UAV and the target object is very short, the size of the tracking frame at the characteristic part in the captured image is relatively large, which will cause the tracking to slow down and thus easily result in the loss of tracking. On the other hand, when the distance between the UAV and the target object is relatively long, the size of the tracking frame of the characteristic part in the captured image is small, which will lead to a blurred tracking feature with less useful information. Both of the two situations mentioned above will lower the reliability of the tracking of the UAV.

In the embodiments of the present disclosure, when the distance between the UAV and the target object is relatively short, the preset part of the human body of the target object is used as a tracking target, that is, the UAV tracks the preset part of the human body of the target object. When the distance between the UAV and the target object is relatively long, the human body of the target object is used as a tracking target, that is, the UAV tracks the human body of the target object. This method can achieve high quality tracking results. The UAV's tracking process of the target object includes four scenarios, as described below:

Scenario I: near-field tracking. When the distance between the UAV and the target object is relatively short, the method of near-field tracking can be used. That is, the preset part (e.g., head, or head and shoulder (also referred to as head-shoulder part), etc.) of the human body of the target object can be used as the tracking target and the preset part of the human body of the target object can be tracked.

Scenario II: far-field tracking. When the distance between the UAV and the target object is relatively long, the method of far-field tracking can be used. That is, the human body of the target object can be used as the tracking target and the human body of the target object can be tracked.

Scenario III: switch from far-field tracking to near-field tracking. The distance between the UAV and the target object is relatively long at first, and the UAV uses far-field tracking method to track the human body of the target object. The distance between the UAV and the target object then starts to become shorter and shorter, and when the distance is shorter than or equal to a distance threshold, a switch from far-field tracking to near-field tracking will be triggered. That is, the UAV no longer tracks the human body of the target object, but starts to track the preset part of the human body of the target object.

Scenario IV: switch from near-field tracking to far-field tracking. The distance between the UAV and the target object is relatively short at first, and the UAV uses near-field tracking method to track the preset part of the human body of the target object. The distance between the UAV and the target object then starts to become longer and longer, and when the distance is longer than or equal to a distance threshold, a switch from near-field tracking to far-field tracking will be triggered. That is, the UAV no longer tracks the preset part of the human body of the target object, but starts to track the human body of the target object.

The process of switching from far-field tracking to near-field tracking and the process of switching from near-field tracking to far-field tracking are described below in connection with specific embodiments. FIG. 1 is a schematic flow chart of an example control method of a mobile platform consistent with the disclosure. The method can be executed by the mobile platform, e.g., by one or more processors of the mobile platform. Each of the one or more processors can be a general-purpose or special-purpose processor.

As shown in FIG. 1, at 101, a captured image is obtained. As described above, the mobile platform can include an image capturing device configured to capture images of the target object while the mobile platform is tracking the target object. The processor of the mobile platform can obtain the captured images. The target object refers to an object being tracked by the mobile platform.

At 102, one or more first characteristic parts (also referred to as "candidate first characteristic parts") are identified from the captured image. Specifically, the processor of the mobile platform can identify the first characteristic part from the captured image. In some embodiments, a neural network (e.g., a convolutional neural network) can be used to identify the one or more first characteristic parts from the captured image. In some embodiments, after the neural network detects the one or more first characteristic parts in the captured image, the neural network can record and return a position and a corresponding image area of each of the one or more first characteristic parts in the captured image. In some embodiments, the position in the captured image and the corresponding image area of a first characteristic part can be represented by a detection frame, i.e., a first characteristic part can be represented by a detection frame.

At 103, a second characteristic part of a target object in the captured image is determined. Specifically, after obtaining the captured image, the processor of the mobile platform can determine the second characteristic part in the captured image. In some embodiments, a tracking algorithm can be used to determine the second characteristic part in the captured image. According to the tracking algorithm, when a current frame of captured image is obtained, a target area is first determined according to a position of the second characteristic part of the target object in a previous frame of captured image. Then, an image area that best matches the second characteristic part of the target object in the previous frame of captured image is searched for in the target area in the current frame of captured image, and the best matching image area is determined as the second characteristic part of the target object in the current frame of captured image. In some embodiments, the second characteristic part of the target object in the current frame of captured image can be represented by a detection frame.

At 104, one or more matching parameters corresponding to the one or more first characteristic parts are determined based on the one or more first characteristic parts and the second characteristic part. In some embodiments, a plurality of first characteristic parts are identified, which include the characteristic part of the target object. A tracking switch from the second characteristic part of the target object to the first characteristic part of the target object is needed when switching between near-field tracking and far-field tracking. Therefore, it is needed to determine which one of the first characteristic parts in the captured image is the first characteristic part of the target object.

In some embodiments, to determine the first characteristic part of the target object, the one or more matching parameters corresponding to the one or more first characteristic parts can be determined according to the second characteristic part of the target object and the one or more first characteristic parts. Each of the one or more first characteristic parts can correspond to one matching parameter. A matching parameter can represent a possibility of a corresponding first characteristic part being the first characteristic part of the target object. In some embodiments, a matching parameter can include at least one of a coincidence degree matching parameter (or simply "coincidence degree"), an image similarity degree matching parameter (or simply "image similarity degree"), or a geometric similarity degree matching parameter (or simply "geometric similarity degree"). That is, the matching parameter can be any one of the coincidence degree matching parameter, the image similarity degree matching parameter, and the geometric similarity degree matching parameter, or be determined based on two or more of the coincidence degree matching parameter, the image similarity degree matching parameter, and the geometric similarity degree matching parameter.

At 105, the first characteristic part of the target object (also referred to as "target first characteristic part") is determined from the one or more first characteristic part based on the one or more matching parameters corresponding to the one or more first characteristic parts. Specifically, as described above, multiple first characteristic parts may be identified from the captured image, where the multiple first characteristic parts include the first characteristic part of the target object. The matching parameters corresponding to the first characteristic parts can be used to determine which first characteristic part is the first characteristic part of the target object. In some embodiments, determining the first characteristic part of the target object from the one or more first characteristic parts based on the one or more matching parameters corresponding to the one or more first characteristic parts includes determining a largest one of the one or more matching parameters and determining the first characteristic part corresponding to the largest matching parameter as the first characteristic part of the target object. Specifically, the larger the matching parameter value, the more possible it may be for the corresponding first characteristic part to be that of the target object. Therefore, the first characteristic part corresponding to the largest one of the one or more matching parameters can be determined to be the first characteristic part of the target object.

At 106, tracking the second characteristic part of the target object is switched to tracking the first characteristic part of the target object if tracking parameters of the target object meet a preset tracking condition. The tracking parameters of the target object can include the size proportion of the tracking frame in the captured image and/or the distance between the target object and the mobile platform. When the tracking parameters do not meet the preset tracking condition, the mobile platform tracks the target object by tracking the second characteristic part of the target object. However, when the tracking parameters meet the preset tracking condition, keeping tracking the second characteristic part of the target object may lead to poor tracking reliability. At this time, switching to track the first characteristic part that is compatible with the current tracking parameters of the target object can be implemented.

In some embodiments where the tracking is switched from a far-field tracking to a near-field tracking, the first characteristic part can be a preset part of the human body and the second characteristic part is the human body. If the tracking parameters of the target object meet a second preset tracking condition, the tracking will switch from tracking the second characteristic part of the target object to tracking the first characteristic part of the target object. Specifically, before the second preset tracking condition is met by the tracking parameters of the target object, the mobile platform uses the far-field tracking strategy to track the second characteristic part of the target object. Once it is confirmed that the tracking parameters of the target object satisfy the second preset tracking condition, the mobile platform will switch to the near-field tracking strategy, i.e., switching from tracking the second characteristic part of the target object to tracking the first characteristic part of the target object.

In some embodiments, the tracking parameters of the target object meeting the second preset tracking condition can include, but is not limited to, the size proportion of the tracking frame of the target object in the captured image being greater than or equal to a preset second proportion threshold and/or the distance between the target object and the mobile platform being shorter than or equal to a preset second distance. The size proportion being greater than or equal to the preset second proportion threshold and/or the distance between the target object and the mobile platform being shorter than or equal to the preset second distance can indicate that the distance between the mobile platform and the target object is relatively short, and hence the tracking strategy can be switched from far-field tracking to near-field tracking, that is, switching from the tracking of the human body of the target object to the tracking of the preset part of the human body of the target object. The preset second proportion threshold and the preset second distance can be configured according to experience, which are not limited here.

Figure 2:
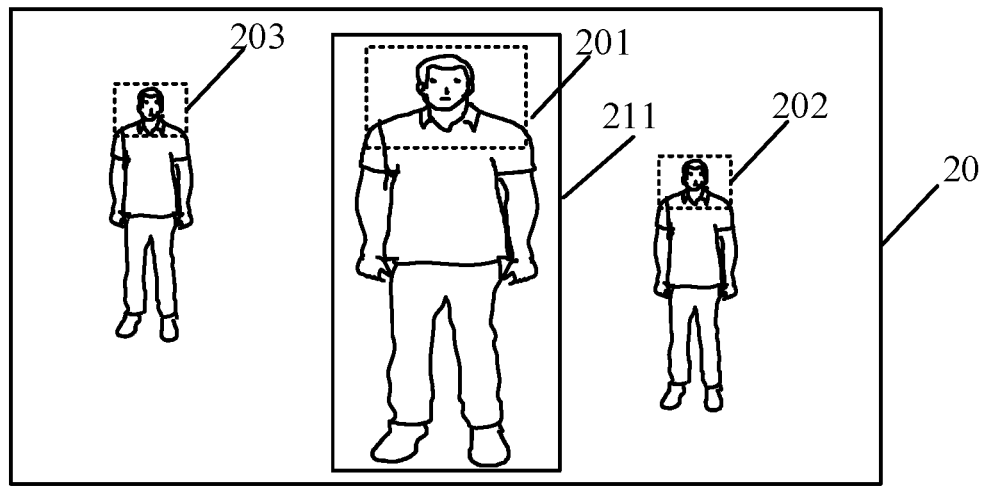
FIG. 2 is a schematic diagram showing switching from tracking a human body of a target object to tracking heads and shoulders of the target object when switching from a far-field tracking to a near-field tracking according to an example embodiment.

For example, as shown in FIG. 2, when the tracking parameters of the target object do not meet the second preset tracking condition, the mobile platform tracks the human body of the target object. The captured image includes a human body 211 of the target object, and head-shoulder parts 201, 202, and 203. In this disclosure, such head-shoulder parts are also referred to as "candidate head-shoulder parts." The matching parameter for each of the head-shoulder part can be determined using the method described above. According to the matching parameters, the head-shoulder part 201 can be determined to be the head-shoulder part of the target object, and can also be referred to as a "target head-shoulder part." When the tracking parameters meet the second preset tracking condition, the tracking strategy switches to tracking the head-shoulder part 201 of the target object.

In some embodiments where the tracking is switched from a near-field tracking to a far-field tracking, the first characteristic part can be a human body and the second characteristic part is a preset part of the human body. If the tracking parameters of the target object meet a first preset tracking condition, the tracking will switch from tracking the second characteristic part of the target object to tracking the first characteristic part of the target object. Specifically, before the first preset tracking condition is met by the tracking parameters of the target object, the mobile platform uses the near-field tracking strategy to track the second characteristic part of the target object. Once it is confirmed that the tracking parameters of the target object satisfy the first preset tracking condition, the mobile platform will switch to the far-field tracking strategy, i.e., switching from tracking the second characteristic part of the target object to tracking the first characteristic part of the target object.

In some embodiments, the tracking parameters of the target object meeting the first preset tracking condition can include, but is not limited to, the size proportion of the tracking frame of the target object in the captured image being smaller than or equal to a preset first proportion threshold and/or the distance between the target object and the mobile platform being longer than or equal to a preset first distance. The size proportion being smaller than or equal to the preset first proportion threshold and/or the distance between the target object and the mobile platform being longer than or equal to the preset first distance can indicate that the distance between the mobile platform and the target object is relatively long, and hence the tracking strategy can be switched from near-field tracking to far-field tracking, that is, switching from the tracking of the preset part of the human body of the target object to the tracking of the human body of the target object. The preset first proportion threshold and the preset first distance can be configured according to experience, which are not limited here.

Figure 3:
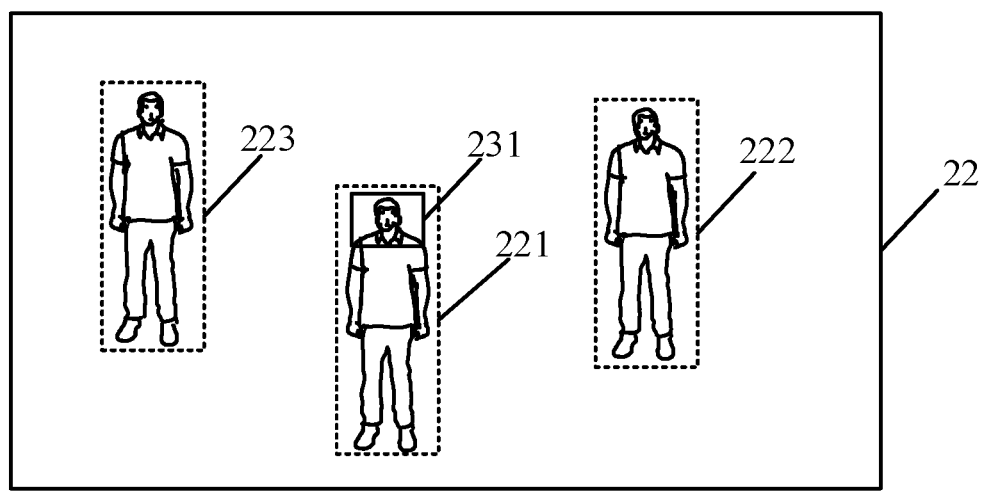
FIG. 3 is a schematic diagram showing switching from tracking heads and shoulders of a target object to tracking a human body of the target object when switching from a near-field tracking to a far-field tracking according to another example embodiment.

For example, as shown in FIG. 3, when the tracking parameters of the target object do not meet the first preset tracking condition, the mobile platform tracks the head-shoulder part of the target object. The captured image includes a head-shoulder part 231 of the target object, and human bodies 221, 222, and 223. In this disclosure, such human bodies are also referred to as "candidate human bodies." The matching parameters for each of the human body can be determined using the method described above. According to the matching parameters, the human body 221 can be determined to be the human body of the target object, i.e., the human body 221 can be determined to be the target human body. When the tracking parameters meet the first preset tracking condition, the tracking strategy switches to tracking the human body 221 of the target object.

In some embodiments, determining the matching parameters corresponding to the first characteristic parts based on the second characteristic part of the target object and the one or more first characteristic parts can include determining the matching parameters between the second characteristic part of the target object and the first characteristic parts based on the second characteristic part of the target object and the first characteristic parts. Specifically, the matching parameters between the second characteristic part of the target object and a particular first characteristic part can represent the degree of matching between the second characteristic part of the target object and that particular first characteristic part. The higher the degree of matching, the more possible it may be for the particular first characteristic part to be the first characteristic part of the target object.

As shown in FIG. 2, the tracking is switched from a far-field tracking to a near-field tracking. The matching parameter between the human body 211 of the target object and the head-shoulder part 201 can be determined according to the human body 211 of the target object and the head-shoulder part 201. The matching parameter between the human body 211 of the target object and the head-shoulder part 202 can be determined according to the human body 211 of the target object and the head-shoulder part 202. The matching parameter between the human body 211 of the target object and the head-shoulder part 203 can be determined according to the human body 211 of the target object and the head-shoulder part 203.

As described above, the matching parameter can be any one of the coincidence degree matching parameter, the image similarity degree matching parameter, and the geometric similarity degree matching parameter.

In some embodiments, the coincidence degree matching parameter between the human body 211 of the target object and the head-shoulder part 201 can be determined based on the human body 211 of the target object and the head-shoulder part 201. The coincidence degree matching parameter is used to indicate the degree of coincidence of two image regions and can be represented by the ratio of the intersection to the union of the two image regions. In this embodiment, the coincidence degree matching parameter between the human body 211 of the target object and the head-shoulder part 201 can be determined by calculating the ratio of the intersection to the union of the region of the human body 211 of the target object and head-shoulder part 201. The higher the coincidence degree matching parameter, the more possible it may be for the head-shoulder part 201 to be the head-shoulder part of the target object.

In some embodiments, the image similarity matching parameter between the human body 211 of the target object and the head-shoulder part 201 can be determined based on the human body 211 of the target object and the head-shoulder part 201. The image similarity matching parameter is used to indicate the degree of similarity between images in two image regions and can be determined using histograms of the images in the two image regions. In this embodiment, the histograms of the human body 211 of the target object and the head-shoulder part 201 are determined, respectively. Then a normalized correlation coefficients (e.g., Barr distance, histogram intersection distance, etc.) between the two histograms can be calculated as the image similarity matching parameter. While the normalized correlation coefficient method is an example, those skills in the art may use other methods to determine the image similarity degree matching parameter, which is not specifically limited here. The degree of similarity between the human body 211 of the target object and the head-shoulder part 201 can be determined according to the image similarity matching parameter between the human body 211 of the target object and the head-shoulder part 201. The higher the image similarity matching parameter, the more possible it may be for the head-shoulder part 201 to be the head-shoulder part of the target object.

In some embodiments, the geometric similarity matching parameter between the human body 211 of the target object and the head-shoulder part 201 can be determined based on the human body 211 of the target object and the head-shoulder part 201. The geometric similarity matching parameter is used to indicate the size matching degree of two image regions. Usually in consecutive image frames, the motion of the target object does not change much, and the change of the distance between the target object and the mobile platform is small. Therefore, the proportional relationship of the size between the characteristic parts of the target object in an image typically exhibits a preset ratio. In this embodiment, the area ratio of the human body 211 of the target object to the head-shoulder part 201 can be calculated according to the area of the human body 211 of the target object and the area of the head-shoulder part 201, and then compared to the preset ratio to determine a difference. In this embodiment, the preset ratio can be the size ratio between the human body and the head-shoulder part. The ratio difference can be used to determine the geometric similarity matching parameter. The degree of size matching between the human body 211 of the target object and the head-shoulder part 201 can be determined according to the geometric similarity matching parameter between the human body 211 of the target object and the head-shoulder part 201. The higher the size matching degree, the more possible it may be for the head-shoulder part 201 to be the head-shoulder part of the target object.

In some embodiments, the matching parameter between the human body 211 and the head-shoulder part 201 can include at least one of the coincidence degree matching parameter, the image similarity degree matching parameter, or the geometric similarity degree matching parameter. That is, those skills in the art may use any one of the coincidence degree matching parameter, the image similarity degree matching parameter, and the geometric similarity degree matching parameter as the matching parameter between the human body 211 and the head-shoulder part 201, or fuse two or more of the coincidence degree matching parameter, the image similarity degree matching parameter, and the geometric similarity degree matching parameter to determine the matching parameter between the human body 211 and the head-shoulder part 201, which is not specifically limited here. With the above described method, the matching parameter between the human body 211 and the head-shoulder part 202, and the matching parameter between the human body 211 and the head-shoulder part 203 can also be determined.

In some embodiments, as shown in FIG. 3, the tracking is switched from a near-field tracking to a far-field tracking. The matching parameter between the second characteristic part 231 and the first characteristic part 221 can be determined according to the second characteristic part 231 of the target object and the first characteristic part 221. The matching parameter between the second characteristic part 231 and the first characteristic part 222 can be determined according to the second characteristic part 231 of the target object and the first characteristic part 222. The matching parameter between the second characteristic part 231 and the first characteristic part 223 can be determined according to the second characteristic part 231 of the target object and the first characteristic part 223. For the specific method of determining the matching parameter between the second characteristic part 231 and the first characteristic part 221, the matching parameter between the second characteristic part 231 and the first characteristic part 222, and the matching parameter between the second characteristic part 231 and the first characteristic part 223, reference can be made to the description above.

In some other embodiments, a third characteristic part can be estimated. The third characteristic part is an estimated first characteristic part of the target object estimated according to the second characteristic part of the target object. Then the matching parameter between the third characteristic part and the one or more first characteristic parts can be determined.

The estimation of the third characteristic part of the target object can include estimating the third characteristic part according to a preset proportional relationship and the second characteristic part of the target object, or estimating the third characteristic part according to one or more joint points of the target object determined by the second characteristic part of the target object. The preset proportional relationship can refer to, e.g., the ratio of the first characteristic part to the second characteristic part of a person, which can be an experience value.

Figure 4:
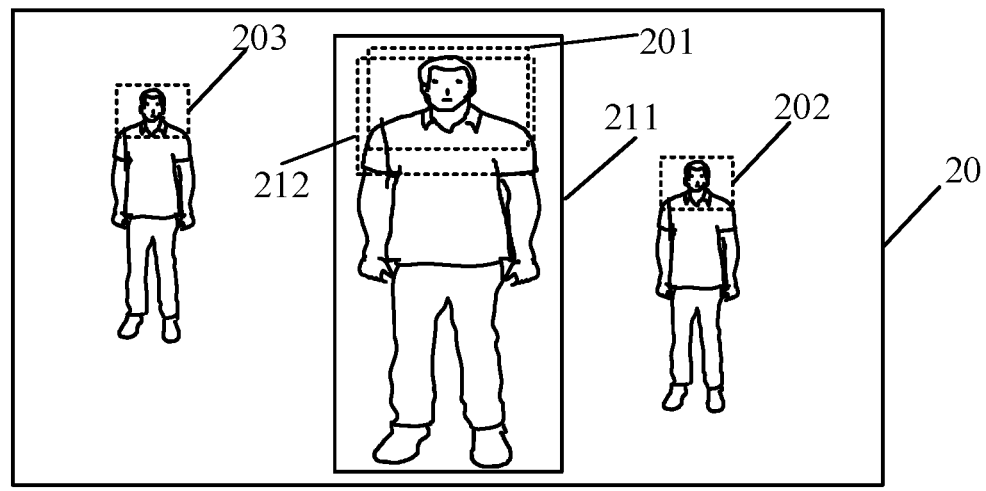
FIG. 4 is a schematic diagram showing an estimation of the heads and shoulders based on a preset proportional relationship and the human body of the target object when switching from the far-field tracking to the near-field tracking according to an example embodiment.

As shown in FIG. 4, the tracking is switched from a far-field tracking to a near-field tracking. A third characteristic part 212, i.e., a head-shoulder part 212, of the target object can be estimated according to the preset proportional relationship and the human body 211 of the target object, where the preset proportional relationship refers to the ratio of the human body to the head-shoulder part of the human body.

Figure 5:
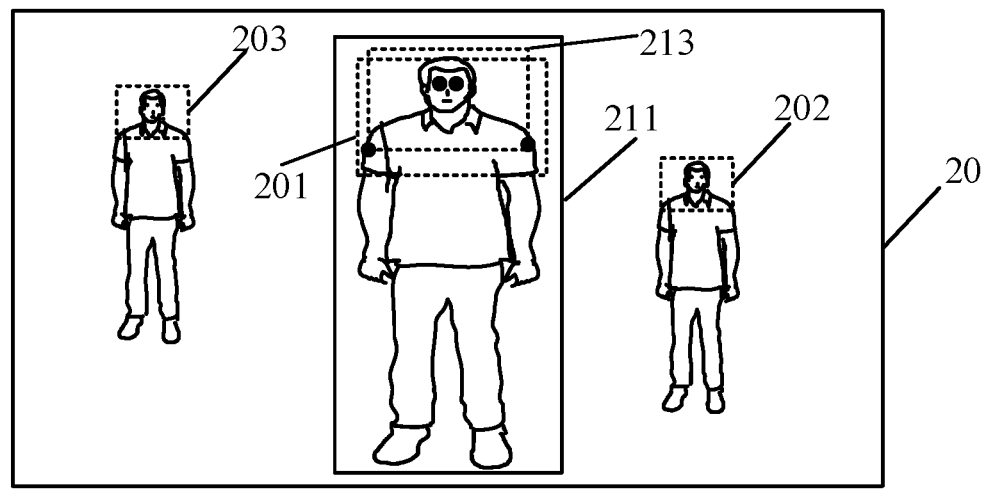
FIG. 5 is a schematic diagram showing an estimation of the heads and shoulders based on a tracking joint of the target object when switching from the far-field tracking to the near-field tracking according to an example embodiment.

As shown in FIG. 5, the tracking is switched from a far-field tracking to a near-field tracking. The joint points of the target object can be determined according to the human body 211, and a head-shoulder part 213 can be estimated according to the joint points of the target object. For example, the joints of shoulders and the joints of eyes of the target object are determined and used to estimate the head-shoulder part 213 of the target object.

After the estimated head-shoulder part 213 is obtained, the matching parameter between the estimated head-shoulder part 213 and the head-shoulder part 201 can be determined according to the estimated head-shoulder part 213 and the head-shoulder part 201. The matching parameter between the estimated head-shoulder part 213 and the head-shoulder part 202 can be determined according to the estimated head-shoulder part 213 and the head-shoulder part 202. The matching parameter between the estimated head-shoulder part 213 and the head-shoulder part 203 can be determined according to the estimated head-shoulder part 213 and the head-shoulder part 203. For the specific method of determining the matching parameter, reference can be made to the description above.

Figure 6:
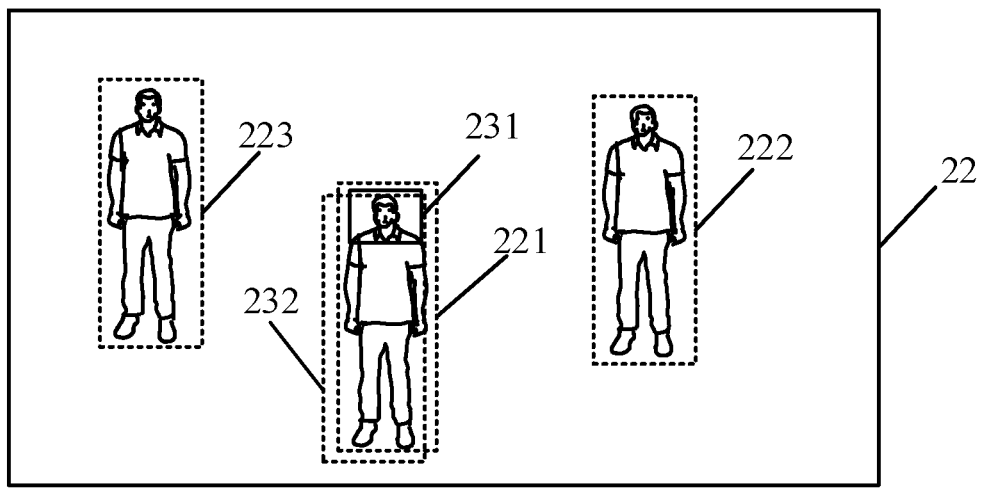
FIG. 6 is a schematic diagram showing an estimation of the human body based on a preset proportional relationship and the tracking heads and shoulders of the target object when switching from the near-field tracking to the far-field tracking according to an example embodiment.

As shown in FIG. 6, the tracking is switched from a near-field tracking to a far-field tracking. The human body 232 can be estimated according to the preset proportional relationship and the head-shoulder part 231 of the target object, where the preset proportional relationship refers to the ratio of the human body to the head-shoulder part.

Figure 7:
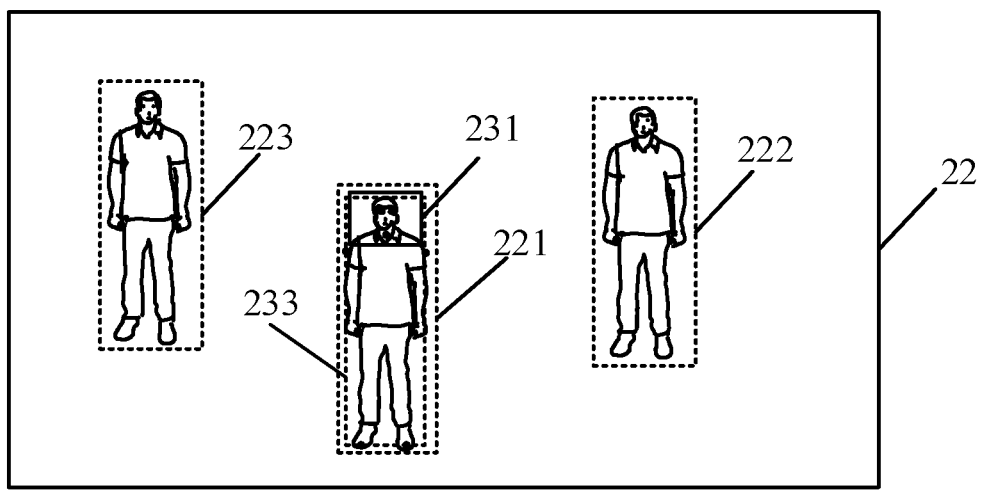
FIG. 7 is a schematic diagram showing an estimation of the human body based on a tracking joint of the target object when switching from the near-field tracking to the far-field tracking according to an example embodiment.

As shown in FIG. 7, the tracking is switched from a far-field tracking to a near-field tracking. The joint point of the target object can be determined according to the head-shoulder part of the target object 231, and the human body 233 can be estimated according to the joint point of the target object. For example, the joints of feet, the joints of shoulders and the joints of eyes of the target object are determined and used to estimate the human body 233 of the target object.

After the estimated human body 233 is obtained, the matching parameter between the estimated human body 233 and the human body 221 can be determined according to the estimated human body 233 and the human body 221. The matching parameter between the estimated human body 233 and the human body 222 can be determined according to the estimated human body 233 and the human body 222. The matching parameter between the estimated human body 233 and the human body 223 can be determined according to the estimated human body 233 and the human body 223. For the specific method of determining the matching parameter, reference can be made to the description above.

In the above embodiments, if there is an overlap of two or more objects in the image, the distance between the top edge of the tracking frame of the first characteristic part corresponding to the largest matching parameter and the top edge of the tracking frame of the second characteristic part can be determined. Specifically, the first characteristic part corresponding to the largest matching parameter is determined to be the first characteristic part of the target object. If the distance is less than or equal to a preset distance threshold (which is usually configured according to experience, and is not restricted here), the first characteristic part corresponding to the largest matching parameter can be considered as the first characteristic part of the target object. If the distance is larger than the preset distance threshold, then the first characteristic part corresponding to the largest matching parameter is eliminated, and a new largest matching parameter will be determined from the remaining ones of the matching parameters, and so on.

For example, in FIG. 2, if the distance between the top edges of the tracking frames of the first characteristic part 201 corresponding to the largest matching parameter and the second characteristic part 211 is less than or equal to the preset distance threshold, the first characteristic part 201 is identified as the first characteristic part of the target object. If the distance is larger than the preset distance threshold, the first characteristic part 201 is eliminated, and the first characteristic part corresponding to a new largest matching parameter can be determined between the first characteristic part 202 and the first characteristic part 203, and so on.

In the above embodiments, the far-field tracking strategy tracks the human body of the target object. When the mobile platform approaches the target object, the size of the tracking frame at the human body in the captured image becomes large, which will cause the tracking speed to slow down. By switching from the far-field tracking to the near-field tracking that tracks the head-shoulder part of the target object, the tracking efficiency can be improved. On the other hand, the near-field tracking strategy tracks the head-shoulder part of the target object. When the mobile platform moves away from the target object, the size of the tracking frame at the head-shoulder part in the captured image becomes small, which reduces the tracking accuracy. By switching from the near-field tracking to the far-field tracking that tracks the human body of the target object, the tracking can be more accurate.

Since the size of the tracking frame may change to some extent, the size of the tracking frame may not be consistent with the size of the tracked target object. Some other auxiliary methods can be used to determine the switching condition to improve the switching accuracy. For example, a depth sensor detection technology combined with the image projection relationship can be used to obtain the depth of the target object in the captured image, hence get the distance between the mobile platform and the target object. If the distance is too short (for example, shorter than or equal to 3 meters), it switches to near-field tracking, if it is too long (for example, longer than 4 meters), it switches to far-field tracking. In some other embodiments, the distance between the mobile platform and the target object can be also obtained with direct ranging method, e.g., binocular ranging, ultrasonic ranging, and lidar ranging, etc.

In an example, the application scenarios applicable to the foregoing embodiments may include but are not limited to, e.g., selfie mode, taking off with a face ID, taking video from near to far, and/or taking surround video from near to far.

Selfie mode. If the target object is a person, the UAV measures the size of the tracking frame when the target object is detected. If the size ratio of the tracking frame in the captured image is greater than or equal to 30%, the detection of the head-shoulder part of the target object is automatically implemented, that is, the near-field tracking is performed. When the target object is relatively far away from the UAV and the size ratio of the tracking frame in the captured image is smaller than 10%, the tracking switches to the far-field to detect the human body of the target object automatically.

Taking off with a face ID. A UAV with a face ID function can start with the near-field tracking (e.g., the head-shoulder part tracking) after a successful face scan. When the target object moves to far away from the UAV, the UAV switches to the far-field tracking (e.g., the human body tracking). This function enables an automatic focus on the user activating the UAV.

Taking video from near to far. The UAV can take off directly from the user's hands, fly obliquely upward and backward, and start to track the head-shoulder part of the target object. Once the UAV flies out and reaches to a relatively long distance away from the target object, it may switch to the far-field tracking to track the human body of the target object.

Taking surround video from near to far. The UAV spirals out to record video after focusing on the human body. Specifically, the UAV can take off directly from the user's hands, and start the spiral flight shooting and tracking of the head-shoulder part of the target object. Once the UAV flies out and reaches to a relatively long distance away from the target object, it may switch to the far-field tracking to track the human body of the target object.

Figure 8:
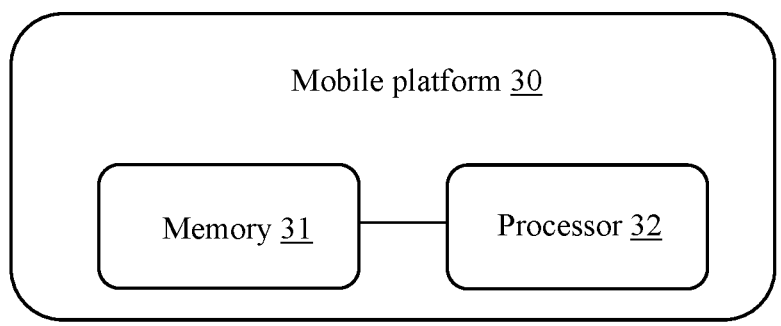
FIG. 8 is a schematic structural diagram of a mobile platform according to an example embodiment.

As shown in FIG. 8, an embodiment of the present disclosure further provides a mobile platform 30 including a memory 31 and a processor 32 (one or more processors).

In one embodiment, the memory is configured to store a computer program and the processor is configured to execute the computer program to obtain a captured image, identify one or more first characteristic parts from the captured image, determine a second characteristic part of a target object in the captured image, determine one or more matching parameters corresponding to the one or more first characteristic parts based on the one or more first characteristic parts and the second characteristic part, determining the first characteristic part of the target object from the one or more first characteristic parts based on the one or more matching parameters corresponding to the one or more first characteristic parts, and switch from tracking the second characteristic part of the target object to tracking the first characteristic part of the target object if tracking parameters of the target object meet a preset tracking condition.

In some embodiments, the processor is further configured to, when determining the one or more matching parameters corresponding to the one or more first characteristic parts based on the second characteristic part of the target object and the one or more first characteristic parts, determine the one or more matching parameters between the second characteristic part of the target object and the one or more first characteristic parts based on the second characteristic part of the target object and the one or more first characteristic parts.

In some embodiments, the processor is further configured to, when determining one or more matching parameters corresponding to the one or more first characteristic parts based on the second characteristic part of the target object and the one or more first characteristic parts, estimate a third characteristic part of the target object. Specifically, the third characteristic part is an estimated first characteristic part of the target object estimated according to the second characteristic part of the target object. Then the matching parameter between the third characteristic part of the target object and the one or more first characteristic parts can be determined according to the third characteristic part of the target object and the one or more first characteristic parts.

In some embodiments, the processor is further configured to, when estimating the third characteristic part of the target object, estimate the third characteristic part of the target object based on the proportional relationship between the second characteristic part of the target object and the third characteristic part of the target object, and the second characteristic part of the target object.

In some embodiments, the processor is further configured to, when estimating the third characteristic part of the target object, estimate the third characteristic part of the target object based on joint point information of the target object that is determined according to the second characteristic part of the target object.

In some embodiments, the processor determines the first characteristic part of the target object from the one or more first characteristic parts according to the one or more matching parameters corresponding to the one or more first characteristic parts. Specifically, the processor determines the largest matching parameter from the one or more matching parameters corresponding to the one or more first characteristic parts and determines the first characteristic part corresponding to the largest matching parameter as the first characteristic part of the target object.

In some embodiments, the first characteristic part can be a human body and the second characteristic part is a preset part of the human body. If the tracking parameters of the target object meet a preset tracking condition, the processor switches the tracking from tracking the second characteristic part of the target object to tracking the first characteristic part of the target object. Specifically, if the tracking parameters of the target object meet the first preset tracking condition, the processor switches the tracking from tracking the second characteristic part of the target object to tracking the first characteristic part of the target object.

The tracking parameters of the target object meeting the first preset tracking condition can include, for example, a size proportion of the tracking frame of the target object in the captured image being smaller than or equal to a preset first proportion threshold and/or a distance between the target object and the mobile platform being longer than or equal to a preset first distance.

In some embodiments, the first characteristic part can be a preset part of the human body and the second characteristic part is the human body. If the tracking parameters of the target object meet a preset tracking condition, the processor switches the tracking from tracking the second characteristic part of the target object to tracking the first characteristic part of the target object. Specifically, if the tracking parameters of the target object meet the second preset tracking condition, the processor switches the tracking from tracking the second characteristic part of the target object to tracking the first characteristic part of the target object.

The tracking parameters of the target object meeting the second preset tracking condition can include, for example, the size proportion of the tracking frame of the target object in the captured image being greater than or equal to a preset second proportion threshold and/or the distance between the target object and the mobile platform being shorter than or equal to a preset second distance.

In some embodiments, the preset part can be a head or a head-shoulder part.

In some embodiments, the processor can be further configured to determine the distance between the top edges of the tracking frames of the first characteristic part corresponding to the largest matching parameter and the second characteristic part.

The processor determines the first characteristic part corresponding to the largest matching parameter as the first characteristic part of the target object. Specifically, if the distance is less than or equal to the preset distance threshold, the processor determines the first characteristic part corresponding to the largest matching parameter as the first characteristic part of the target object.

In some embodiments, the matching parameter can include at least one of a coincidence degree matching parameter, an image similarity degree matching parameter, or a geometric similarity degree matching parameter.

An embodiment of the present disclosure further provides a computer readable storage medium that stores computer commands. When the computer commands are executed (by the processor), the mobile platform can be controlled according to a method consistent with the disclosure, such as one of the example methods described above.

The system, device, module or unit described in the above embodiments may be implemented by a computer chip or entity, or by a product with a certain function. A typical implementation device is a computer, such as a personal computer, a laptop computer, a cellular phone, a smart phone, a personal digital assistant, a media player, a navigation device, an email sending and receiving device, a game console, a tablet computer, a wearable device, or any combination of any of these devices.

For simplification purposes, above devices are divided into various units according to their functions when being described. Of course, when the present disclosure is implemented, the functions of each unit can be implemented in the same or multiple software and/or hardware.

Those of ordinary skill in the art should appreciate that embodiments of the present disclosure may be provide as a method, a system, or a computer program product. Therefore, the present disclosure may take the form of an entirely hardware embodiment, an entirely software embodiment, or an embodiment combining software and hardware aspects. Moreover, embodiments of the present disclosure may take the form of a computer program product implemented on one or more computer-usable storage media (including but is not limited to hard disk storage, CD-ROM, optical memory, etc.) containing computer-executable program code therein.

The present disclosure is described with reference to flowcharts and/or block diagrams of methods, devices (systems), and computer program products according to embodiments of the present disclosure. Each process and/or block in the flowchart and/or block diagram and a combination of the process and/or block in the flowchart and/or block diagram can be implemented by computer program commands. These computer program commands can be provided to the processor of general-purpose computer, special-purpose computer, embedded processor, or other programmable data processing device to produce a machine, so that the commands generated by the processor of the computer or other programmable data processing device can be used to realize the functions specified in one or more flowcharts and/or one or more blocks of the block diagram.

The computer program commands may also be stored in a computer-readable memory capable of directing a computer or other programmable data processing device to work in a specific manner, so that the commands stored in the computer-readable memory produce a manufactured article including the commands device that implements the functions specified in one or more workflow in a flowchart, and/or one or more blocks in the block diagram.

The computer program commands may also be loaded into a computer or other programmable data processing device, so that operating steps in sequence can be performed on them to produce a computer-implemented process that implements the functions specified in one or more workflow in a flowchart, and/or one or more blocks in the block diagram.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A control method for a mobile platform comprising:
   obtaining a captured image;
   identifying one or more candidate first characteristic parts from the captured image;
   determining a second characteristic part of a target object in the captured image;
   determining one or more matching parameters each corresponding to one of the one or more candidate first characteristic parts based on the one or more candidate first characteristic parts and the second characteristic part;
   determining a target first characteristic part of the target object from the one or more candidate first characteristic parts based on the one or more matching parameters; and
   switching from tracking the second characteristic part to tracking the target first characteristic part in response to a tracking parameter of the target object meeting a preset tracking condition.

2. The method of claim 1, wherein determining the one or more matching parameters includes, for each of the one or more matching parameters, determining the matching parameter between the second characteristic part and the corresponding candidate first characteristic part based on the second characteristic part and the corresponding candidate first characteristic part.

3. The method of claim 1, wherein determining the one or more matching parameters includes:
   estimating a third characteristic part of the target object based on the second characteristic part; and
   determining one or more matching parameters between the third characteristic part and the one or more candidate first characteristic parts as the one or more matching parameters corresponding to the one or more candidate first characteristic parts.

4. The method of claim 3, wherein estimating the third characteristic part includes estimating the third characteristic part based on the second characteristic part and a proportional relationship between the second characteristic part and the third characteristic part.

5. The method of claim 3, wherein estimating the third characteristic part includes:
   determining joint point information of the target object according to the second characteristic part; and
   estimating the third characteristic part based on the joint point information.

6. The method of claim 1, wherein identifying the target first characteristic part includes:
   determining a largest matching parameter among the one or more matching parameters; and
   determining the candidate first characteristic part corresponding to the largest matching parameter as the target first characteristic part.

7. The method of claim 6, further comprising:
   determining a distance between a top edge of a tracking frame of the candidate first characteristic part corresponding to the largest matching parameter and a top edge of a tracking frame of the second characteristic part; and
   determining the candidate first characteristic part corresponding to the largest matching parameter as the target first characteristic part includes determining the candidate first characteristic part corresponding to the largest matching parameter as the target first characteristic part in response to the distance being less than or equal to a preset distance threshold.

8. The method of claim 1, wherein:
   the target first characteristic parts include a target human body and the second characteristic part includes a preset part of the target human body; and
   switching from tracking the second characteristic part to tracking the target first characteristic part includes switching from tracking the preset part of the target human body to tracking the target human body.

9. The method of claim 8, wherein the preset tracking condition includes at least one of:
   a size proportion of a tracking frame of the target object in the captured image being smaller than or equal to a preset proportion threshold, or
   a distance between the target object and the mobile platform being larger than or equal to a preset distance threshold.

10. The method of claim 1, wherein:
    the target first characteristic part includes a preset part of a target human body and the second characteristic part includes the target human body; and
    switching from tracking the second characteristic part to tracking the target first characteristic part includes switching from tracking the target human body to tracking the preset part of the target human body.

11. The method of claim 10, wherein the preset tracking condition includes at least one of:
    a size proportion of a tracking frame of the target object in the captured image being greater than or equal to a preset proportion threshold, or
    a distance between the target object and the mobile platform being less than or equal to a preset distance threshold.

12. The method of claim 10, wherein the preset part includes a head or a head-shoulder part.

13. The method of claim 1, wherein the matching parameter includes at least one of a coincidence degree, an image similarity degree, or a geometric similarity degree.

14. A mobile platform comprising:
    a memory storing a computer program; and
    a processor configured to execute the computer program to:
       obtain a captured image;
       identify one or more candidate first characteristic parts from the captured image;
       determine a second characteristic part of a target object in the captured image;

determine one or more matching parameters each corresponding to one of the one or more candidate first characteristic parts based on the one or more candidate first characteristic parts and the second characteristic part;

determine a target first characteristic part of the target object from the one or more candidate first characteristic parts based on the one or more matching parameters; and switch from tracking the second characteristic part to tracking the target first characteristic part in response to a tracking parameter of the target object meeting a preset tracking condition.

15. The mobile platform of claim 14, wherein the processor is further configured to execute the computer program to:

determine a largest matching parameter among the one or more matching parameters; and determine the candidate first characteristic part corresponding to the largest matching parameter as the target first characteristic part.

16. The mobile platform of claim 15, wherein the processor is further configured to execute the computer program to:

determine a distance between a top edge of a tracking frame of the candidate first characteristic part corresponding to the largest matching parameter and a top edge of a tracking frame of the second characteristic part; and determine the candidate first characteristic part corresponding to the largest matching parameter as the target first characteristic part in response to the distance being less than or equal to a preset distance threshold.

17. The mobile platform of claim 14, wherein:

the target first characteristic parts include a target human body and the second characteristic part includes a preset part of the target human body; and the processor is further configured to execute the computer program to switch from tracking the preset part of the target human body to tracking the target human body.

18. The mobile platform of claim 17, wherein the preset tracking condition includes at least one of:

a size proportion of a tracking frame of the target object in the captured image being smaller than or equal to a preset proportion threshold, or a distance between the target object and the mobile platform being larger than or equal to a preset distance threshold.

19. The mobile platform of claim 14, wherein:

the target first characteristic part includes a preset part of a target human body and the second characteristic part includes the target human body; and the processor is further configured to execute the computer program to switch from tracking the target human body to tracking the preset part of the target human body.

20. The mobile platform of claim 19, wherein the preset tracking condition includes at least one of:

a size proportion of a tracking frame of the target object in the captured image being greater than or equal to a preset proportion threshold, or a distance between the target object and the mobile platform being less than or equal to a preset distance threshold.

21. The mobile platform of claim 19, wherein the preset part includes a head or a head-shoulder part.

* * * * *